Figures 1, 2:
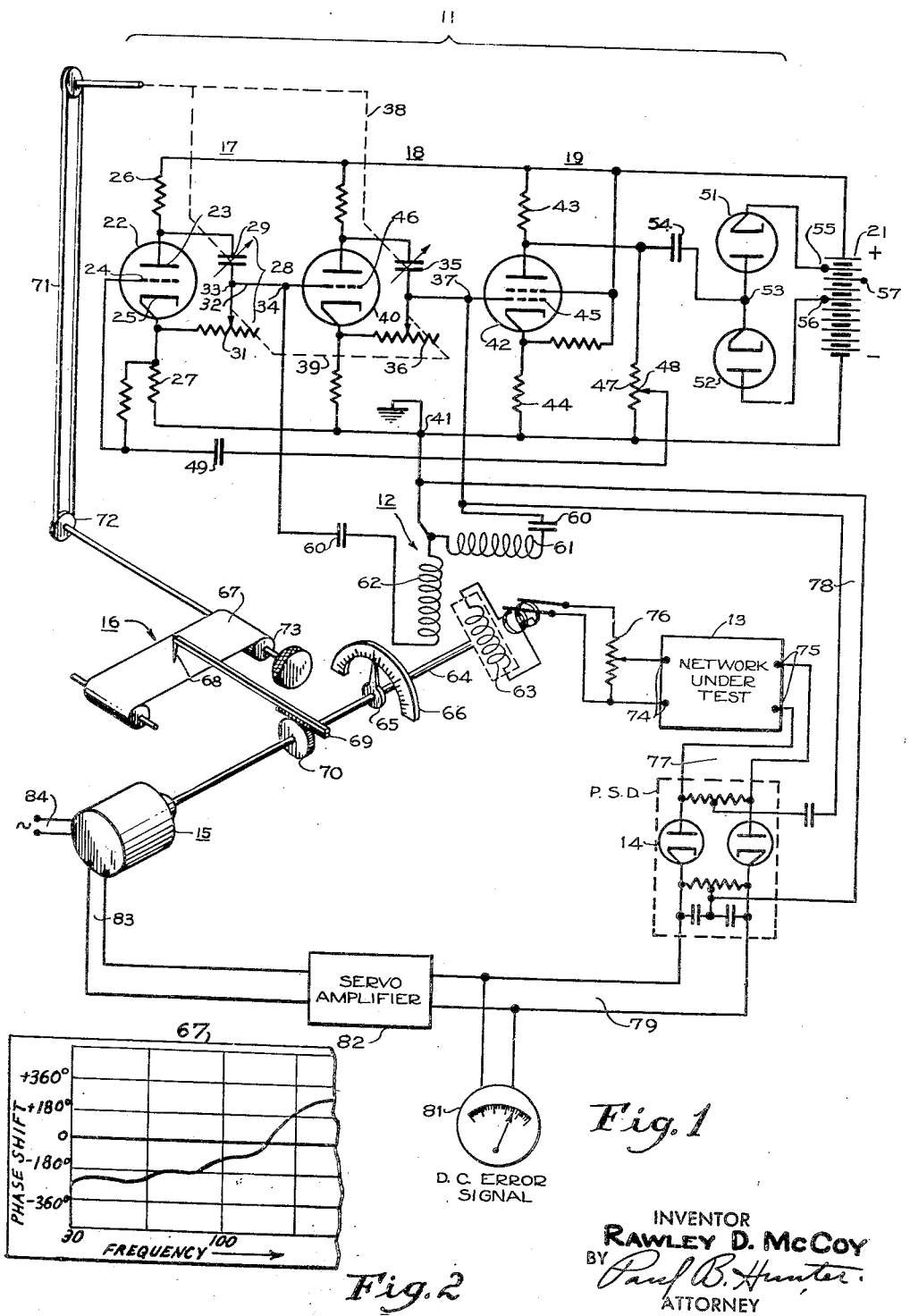

INVENTOR
RAWLEY D. McCOY
BY
Paul B. Hunter
ATTORNEY

Patented Nov. 2, 1948

2,452,587

UNITED STATES PATENT OFFICE 2,452,587

NETWORK MEASURING APPARATUS

Rawley D. McCoy, Bronxville, N. Y., assignor to The Sperry Corporation, a corporation of Delaware Original application March 23, 1944, Serial No. 527,769. Divided and this application February 24, 1945, Serial No. 579,592

3 Claims. (Cl. 346—32)

The present invention relates to electric circuits, and particularly to circuits for measurement of the transmission characteristics of electrical networks. This application is a division of application Serial No. 527,769, filed March 23, 1944.

A principal object of the present invention is the provision of a system for rapidly and accurately ascertaining the characteristics of an electrical network.

Another object is to provide an arrangement for ascertaining the output vs. frequency characteristics of a network.

Yet another object is to provide improved apparatus for measuring or recording variation with frequency of network transmission characteristics.

A further object of the present invention is to provide arrangements for producing and testing phase shifts as great as or exceeding 360 degrees.

A still further object is to provide arrangements for producing continuous tests of phase shifts of apparatus under varying conditions and for making measurements of phase shifts which may be as great as a plurality of complete 360-degree phase rotations.

Still another object of the invention is to provide an automatic indicating or recording phase-shift-reading apparatus of the null or balanced type.

In carrying out the present invention in its preferred form, I provide a variable-frequency oscillator arranged to supply a first output signal and an adjustable signal transfer device for receiving energy from said oscillator and supplying a second output signal, said first and second signals being characterized by a frequency determined precisely according to the adjustment of the oscillator and by relative phase dependent in a predetermined manner on the adjustment of the transfer device. One of these output signals is applied directly to one input circuit of a phase-responsive apparatus, and the other output signal is coupled through a test network to the other input circuit of the phase-responsive apparatus. The phase-responsive apparatus is arranged to cause variation of the adjustment of the transfer device in response to variations of relative phase of the signals supplied to the phase-responsive apparatus, and in the manner to suppress or overcome these variations of relative phase. The resultant variation of the adjustment of the transfer device as a function of the oscillator frequency then denotes the phase-frequency transmission characteristics of the test network. Such characteristics may automatically be portrayed graphically by a recorder jointly responsive to variations of adjustment of the oscillator frequency and the transfer device phase shift.

For a universal range of network phase shift variation, the transfer device preferably is arranged for providing continuous phase shift adjustment over an unlimited range. Preferably, also, this device and the oscillator are arranged to supply output signals of amplitude independent of frequency or phase shift adjustment, and of relative phase dependent merely upon the adjustment of the transfer device and independent of the oscillator frequency.

A better understanding of the invention will be afforded by the following detailed description, considered in conjunction with the accompanying drawing, and those features which are believed to be novel and patentable will be pointed out in the claims appended hereto.

In the drawing, Fig. 1 is a circuit diagram of a preferred embodiment of the present invention, and Fig. 2 is a representation of a portion of a graph produced by the apparatus of Fig. 1.

The apparatus illustrated comprises a two-phase oscillator or alternating signal source 11, an adjustable transfer device such as a calibrated phase-shifting device 12 illustrated as of the self-synchronous data transmitter type, energized by the two-phase oscillator and adapted to supply a voltage to a network 13 to be tested, a phase-sensitive detector 14 and a servo mechanism 15 responsive to the phase-sensitive detector 14 for moving the self-synchronous unit 12 to the position in which the phase-sensitive detector 14 is balanced. For producing graphic records of phase shift in the network 13 a curve-drawing device 16 may be connected to the servo motor 15.

The oscillator 11 is described and claimed in copending application Serial No. 527,769, of which the present application is a division. The oscillator 11 comprises a pair of phase-shifting stages 17 and 18 and an inversion stage 19 energized by a common source of plate voltage 21. The stages 17 and 18 may comprise triode vacuum tubes and the inversion stage 19 may also comprise a triode vacuum tube, if desired, since it is required to supply only the losses in the stages 17 and 18. However, the invention is not limited to the use of triode vacuum tubes and for the sake of illustration, the stage 19 is represented as comprising a tetrode vacuum tube.

The stage 17 comprises a tube 22 having an anode 23, a control electrode or grid 24, and a cathode 25, with an anode resistor 26 in series with the lead to the positive terminal of a source 21, a cathode resistor 27 in series with the lead to the negative terminal of the voltage supply 21, and a phase-shifting circuit 28 connected between the anode 23 and the cathode 25. The phase-shifting circuit 28 comprises a pair of electric circuit elements 29 and 31, connected in series, the circuit elements being different types of impedance; for example, as illustrated the element 29 is a capacitor, and the element 31 is a resistor. One of the series connected circuit elements is made variable for the sake of varying the phase shift as will become apparent hereinafter.

A conductor 32 is brought out from a junction terminal 33 of the phase-shifter elements 29 and 31 and an oscillator output terminal 34 may be connected to the conductor 32.

The phase-shifter stage 18 of the oscillator 11 comprises elements similar to those of the phase shifter 17 including, for example, a tube 40, a condenser 35 and a resistor 36, and a second phase output terminal 37. In order to produce a substantially exact quadrature relationship between the voltages at the output terminals 34 and 37, when the apparatus 11 is in oscillation, a substantially constant impedance relationship is maintained between elements 29 and 31 and the elements 35, 36. Preferably the elements 29 and 35 are alike, and the elements 31 and 36 are alike. In case the capacities are to be varied, a mechanical connection 38 is preferably provided for ganging the condensers 29 and 35, and in case the resistors 31 and 36 are to be varied, a similar mechanical connection 39 is preferably provided for causing like variations in the resistances of the elements 31 and 36. A ground connection 41 serves as a neutral terminal of the two-phase oscillator 11.

The inversion circuit 19, as shown, comprises a vacuum tube 42 having an anode load resistor 43, a stabilizing cathode resistor 44, and conventional electrodes including an input control electrode or grid 45. The grid 45 is coupled to the output terminal 37 of the phase-shifter stage 18, and the phase-shifter stage 18 has a control electrode or grid 46 coupled to the output terminal 34 of the phase-shifter stage 17. The output of the inversion stage 19 is in turn coupled back to the control electrode or grid 24 of the phase-shifter stage 17. For the sake of providing adjustment of the amplitude of oscillation, a potentiometer 47 may be provided consisting of a resistor connected between the anode of the tube 42 and the grounded negative terminal of the source 21 with a tap 48 adjustable in position connected to the first stage grid 24. For use at extremely low frequencies direct connections are preferably employed to the grids, however, when it is desired to produce frequencies as high as the lower range of the audio frequency band such as 10 cycles, for example, and particularly at higher frequencies it is desirable to make one of the connections non-conductive, and a coupling condenser 49 is then preferably interposed in the connection between the potentiometer tap 48 and the first stage input grid 24.

In order to guard against having the amplitude of oscillation build up to such an extent as to impair the wave-form, I prefer to provide a limiter for the oscillator 11. Such a limiter may take the form, for example, of a pair of diodes 51 and 52, connected in series with unlike terminals connected together and a junction terminal 53 coupled to a suitable oscillating point. The terminal 53 may, for example, be coupled to the anode of the inversion stage 43 through a coupling condenser 54. The diodes 51 and 52 are connected across two points, the potential difference between which is maintained equal to the desired maximum swing of the controlled point of the oscillator 11, and the absolute potential of the points to which the diodes 51 and 52 are connected is also fixed with respect to a fixed-potential point of the oscillator such as the ground connection. For example, the diodes 51, 52 may be connected to a pair of battery terminals 55 and 56, the voltage between which equals the desired maximum swing of the anode of the inversion stage 43. With respect to the battery terminals 55 and 56, there is a mid-terminal 57 which is grounded or maintained at a fixed potential with respect to ground. When a coupling condenser 54 is employed instead of the direct connection between the terminal 53 and the inversion stage 43, it is immaterial what the absolute potential of the points 55 and 56 may be so long as it is fixed, since the requisite difference between the average potential of the anode of the inversion circuit 43 and the average potential terminal 57 of the terminals 55 and 56 is allowed to build up on the condenser 54. The terminals 55, 56 and 57 may, therefore, be points in the tube power supply 21.

The self-synchronous unit 12 comprises a two-phase stator having a pair of field windings 61 and 62 mounted in space quadrature, and a rotatable mounted armature or rotor 63, thus forming what may be called a rotary transformer. It may, e. g., be a two-phase unit of the "Selsyn" type, or it may be a unit of the "Telegon" type having a rotatable Z-shaped core and stationary windings.

The rotor 63 may be provided with a shaft 64 carrying a pointer 65 cooperating with a fragmentarily represented scale 66 calibrated in phase-shift angles.

Although not shown in the drawing for the sake of simplicity, means should be provided for preventing the self-synchronism unit 12 from loading the stages 17 and 18. For example, cathode follower stages may be interposed between the terminals 34 and 37 and the windings 61 and 62, respectively. Blocking condensers 60 are provided to keep direct current out of the windings 61 and 62.

The recorder 16 comprises a movable chart 67 and a movable pen 68. The pen 68 is mechanically connected to the self-synchronous device rotor 63 in any suitable manner as by means of a rack-carrying linkage 69 engaging a pinion 70 on the shaft 64. If it is desired to produce a curve representing variation of phase-shift angles with frequency, a linkage represented at 71 is provided, interconnecting the chart 67 and the frequency-controlling adjustment represented by the condenser gang control 38. The connection 71 may, for example, take the form of a chain drive between a sprocket 72 secured to a chart-carrying drum 73 and a similar sprocket (not shown) connected to the condenser control arm 38.

The recorder 16 is arranged for the drum 73 to be rotated with resultant movement of chart 67 in precisely controlled relation with frequency variation of the two-phase output of oscillator 11. The oscillator 11 is of a type especially suited to cooperate with the recorder drum 73, since the output frequency of the oscillator is substantially instantaneously responsive to the variation of the ganged reactance elements 29 and 35. The very wide frequency range of oscillator 11 also adapts it particularly for supplying the two-phase electric signal for application to the unit 12.

With the above features, the phase-shift tester and recorder is suitable for use with phase-shift vs. frequency chart forms based on predetermined relations between oscillator output frequency and the position of the recorder drum 73.

The network 13 is represented as being a four-terminal network having two input terminals 74 and two output terminals 75. If desired, a potentiometer 76 may be interposed between the rotor winding 63 and the input terminals 74.

The phase-sensitive device 14 may be a phase-responsive demodulator of conventional type having a pair of input leads 77 connected to the network output terminals 75, a pair of reference voltage input leads 78 connected across a suitable source of reference voltage such as one of the phases of the oscillator 11 represented by the terminals 37 and 41, and a pair of output leads 79 to which an indicating device 81 may be connected for indicating the presence of a direct-current error-signal in case the phase relationship between the voltages at the terminals 75 and the reference voltage leads 78 departs from quadrature.

The phase-sensitive demodulator 14 need not be described in detail as it does not constitute a part of my invention. An example of such devices is described in the copending application of Gifford E. White, Serial No. 478,807, filed March 11, 1943, and another example is illustrated in Fig. 6 of Patent No. 2,042,831 to Crosby.

The scale 66 may be so calibrated that if there is no phase shift in the network 13 a zero indication will be produced on the scale 66 by the pointer 65 when the rotor 63 is in such a position as to give zero output at the indicator 81. Readings may then be made by adjusting the angular position of the rotor 63 manually to give a zero indication in the instrument 81. In order to produce phase-frequency curves rapidly, however, it is preferable to provide automatic adjustment of the angular position of the rotor shaft 63 and the servo motor 15 is therefore provided which is responsive to polarity of direct-current input and preferably a suitable servo amplifier 82 is interposed between the output leads 79 of the phase-sensitive demodulator 14 and a pair of control leads 83 of the servo motor 15. It will be understood that such a servo motor is provided with a suitable source of power input through leads 84. The servo motor 15 may take the form of a direct-current motor with an armature fed through the leads 84 and a field winding fed through the leads 83, or if desired, a more elaborate servo system may be employed such as disclosed in the application of G. DeWestfelt, Serial No. 464,297, filed November 2, 1942, now Patent No. 2,411,871, granted December 3, 1946.

Since the phase-shifting elements 29 and 31 of the phase shifters 17 and 18 are low-loss devices, low gain amplifier stages may be used which have inherent stability.

The phase shift at any frequency, assuming the resistors 31 and 36, and the condensers 29 and 35 do not load the phase inverters, will be $\theta = 2 \tan^{-1}(2\pi FRC)$ where $\theta$ is the phase shift in radians, $F$ is the frequency in cycles per second, $R$ is the resistance of the elements 31, 36 in ohms, and $C$ is the capacity of the elements 29, 35 in farads. When $2\pi FRC$ equals one, the phase shift of each phase shifter will be 90 degrees.

With the two phase shifters 17 and 18 placed in cascade, as shown, there will be a phase shift of 180 degrees from the grid 24 to the output terminal 37 when the frequency is $$F = \frac{1}{2\pi RC}$$

So long as the resistances of the units 31 and 36 are maintained equal and the capacities of the condensers 29, 35 are maintained equal, the voltages from the terminals 34 and 37 to the ground or neutral terminal 41 will be 90 degrees out of phase so that a two-phase alternating-current source is formed. It will be understood that the gain of the tube 42 is preferably only sufficient to cause oscillation to start. Since no resonant circuits are employed the frequency range throughout which the oscillator 11 may be varied is limited only by the range of variability of the variable elements 29, 31, 35 and 36. As the remainder of the apparatus employs only inductive voltage transfer elements without any resonant circuit elements, the apparatus as a whole may be employed for testing phase shift of networks over an exceedingly wide range of frequencies. If desired, the linkage 69 between the shaft 64 and the recording pen 68 may be such as to indicate the number of revolutions of the shaft 64 and a record may thereby be produced showing complete rotations in phase of the phase shift in the network 13 as the frequency input thereto is varied over a range of frequencies.

To operate the apparatus shown in Fig. 1, the cathodes of the electron discharge devices 22, 40, 42, 51 and 52 and the electron discharge devices in the phase sensitive detector 14 are heated as by a heater energization battery circuit (not shown). Stages 17 and 18 are rendered operative as vacuum tube phase shifter circuits, and stage 19 is rendered operative as a phase inverter and feedback amplifier. These three stages operate in a ring feedback circuit. The overall gain through this feedback loop is so adjusted that a condition of oscillation can be sustained only when grid 45 of stage 19 is energized by signal voltage of phase precisely opposite the voltage at anode 23. Since resistors 31 and 36 present equal resistance values and capacitors 29 and 35 present equal capacitance values, the phase shifts in stages 17 and 18 are equal, and hence, each of these phase shifts must be just 90° for the 180° phase shift condition between anode 23 and grid 45. Such a phase shift condition corresponds to equality of the impedance magnitudes of resistance and reactance in each of the series R.-C. circuits 31, 29 and 36, 35, so that the settings of these variable impedance elements determine the frequency of oscillation.

Since the angular adjustment of the drum 73 is accompanied by predeterminedly correlated variation of ganged impedance elements 29 and 25, recording forms such as that illustrated in Fig. 2 may be printed with fixed calibration scales for use in the recorder system.

As the drum 73 is rotated, the frequency of the oscillator changing according to the calibrated frequency scale along the axis of abscissae on graph 16, the first phase output voltage component of oscillator 11 is produced between junction point 34 and the ground junction 41 and the second output voltage component is produced between junction 37 and the ground junction 41.

These respective phase voltages remain in phase quadrature relation and remain equal in amplitude, by virtue of the fixed gain and fixed phase relations among the stages 17, 18 and 19 of the oscillator 11. Accordingly, the polyphase unit 12 has its field coils 61 and 62 ideally energized at whatever frequency the system 13, 12, 71, 38 is adjusted for, and the phase shift between a selected one of the input voltages thereof (in the illustrated system, the voltage between junction points 37 and 41) and the output voltage across secondary winding 63, is independent of oscillator frequency and is dependent solely upon the angular position of the rotor winding 63. Moreover, the output voltage of winding 63 is constant, being independent of frequency of the oscillator 11. Also, the phase shifter arrangement 12 is susceptible of continuous and unlimited phase shift, the phase shift for $n$ clockwise revolutions being $n \times 360°$. These features are particularly important for achieving versatility of the phase characteristics determining apparatus.

The servo system including phase sensitive detector 14, servo amplifier 82 and servo motor 15 operates to adjust the angular position of winding 63 in such a way as to retain substantially fixed phase relations between the two input voltages applied to the phase sensitive detector 14. In the arrangement as illustrated in Fig. 1, this means that for every change of the phase angle between input circuit 74 and output circuit 75 and the network 13, there must be an equal (and in this apparatus arrangement, an opposite) change of the phase angle between winding 61 and winding 63 of the phase shifter 12. Accordingly the pointer 65 associated with the calibrated scale 66 always indicates a phase shift equal to that of the network 13, and stylus 68 moves transversely with respect to record 67 according to the phase shift-vs.-frequency characteristics of network 13 as the drum 73 is rotated and the frequency of oscillator 11 is correspondingly varied.

Accordingly, the angular position of the pointer 65 and the position of the pen 68 on the chart 67 are indicative at all times of the phase shift in the network 13.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. Network transmission test apparatus, comprising a two-phase signal generator having a frequency control device, said generator being so constructed and arranged as to produce two output voltages of equal amplitude and of quadrature phase relationship and of frequency fixedly related to the adjustment of said frequency control device, a two-phase variable coupling device having an output winding and having two quadrature field windings coupled to the respective phase output circuits of said signal generator to be excited in phase quadrature thereby, a phase sensitive detector having two phase comparison input circuits and an output circuit, means for coupling the output winding of said coupling device to one of said phase comparison input circuits and for coupling a phase output circuit of said signal generator to the other of said phase comparison input circuits, said coupling means including means for interposing a test network in the coupling to one of said phase comparison input circuits, and means responsive to the output of said phase sensitive detector for controlling the adjustment of said variable coupling device to suppress variations from a substantially fixed phase relation between the input signals supplied to the phase sensitive detector input circuits, whereby the adjustment of said variable coupling device is made to vary with variations of adjustment of said frequency control device according to the phase shift versus frequency characteristics of the network under test.

2. Network transmission test apparatus comprising a first vacuum tube amplifier stage having a phase shifting output circuit including a pair of output terminals across which a first phase voltage is to be produced, a second amplifier stage arranged to receive said first phase voltage and including a phase shift circuit for producing a second phase voltage in phase quadrature with said first phase voltage, amplifier means coupling said second phase output terminals to said first vacuum tube amplifier stage, said amplifier means and said first tube amplifier stage being so arranged as to sustain oscillation at the frequency at which the first phase and second phase voltages are in phase quadrature, a variable energy transfer device having a first coil coupled to said first phase output terminals and a second coil in quadrature with said first coil coupled to said second phase output terminals and an adjustable coupled output coil for providing an output voltage of phase relative to said second phase output dependent upon the adjustment of said device, a phase sensitive servo system having first and second comparison phase input circuits and an output coupling to said variable transfer device, means for coupling one of said phase comparison input circuits to the output winding of said variable transfer device and for coupling the other of said phase comparison input circuits to one of said amplifier stage output circuits, said coupling means including means for interposing a test network in the input coupling to one of said phase comparison input circuits, said servo system being so arranged as to adjust said variable energy transfer device in the manner to suppress relative phase variations between the voltages at said first and second phase comparison input circuits, a stylus coupled to said servo system and arranged to be moved thereby along a predetermined path of movement in predetermined relation to the adjustment of said variable energy transfer device, and means for varying the position of a recording medium transversely of said path of stylus movement and for simultaneously adjusting the phase shifts in the output circuits of said first and second vacuum tube amplifier stages by corresponding extents, whereby the frequency of the quadrature-phase output voltages applied to the quadrature windings of said variable energy transfer device is varied in predetermined relation with the movement of said recording medium and said recording stylus graphically depicts the phase-frequency characteristics of the network under test.

3. Network transmission test apparatus comprising a variable frequency generator including means for adjusting the frequency thereof, means having two input circuits for receiving first and second alternating voltages, a first coupling channel connected between said generator and one of said input circuits, a second coupling channel including said phase shifter connected between said generator and the second input circuit of said receiving means, means for including a test network in one of said channels, coupling means responsive to phase shift between said first and second alternating voltages for adjusting said phase shifter according to the phase angle between said first and second voltages, a recorder including a first element comprising a record receiving medium and a stylus second element, means for simultaneously moving said frequency adjusting means and one of said two elements of said recorder, and means coupling the other recorder element to said phase shifter adjusting means for varying the position thereof according to the position of said phase shifter adjusting means.

RAWLEY D. McCOY.

REFERENCES CITED

The following references are of record in the file of this patent:

UNITED STATES PATENTS

| Number | Name | Date |
| --- | --- | --- |
| 1,050,082 | Pearson | Jan. 7, 1913 |
| 1,596,942 | Nyquist et al. | Aug. 24, 1926 |
| 1,684,403 | Mason | Sept. 18, 1928 |
| 1,841,088 | Christopher | Jan. 12, 1932 |
| 1,910,418 | Zuschlag | May 23, 1933 |
| 2,099,890 | James | Nov. 23, 1937 |
| 2,150,006 | Parker et al. | Mar. 7, 1939 |
| 2,162,827 | Schrader | June 20, 1939 |
| 2,225,346 | La Pierre | Dec. 17, 1940 |
| 2,256,487 | Moseley et al. | Sept. 23, 1941 |
| 2,285,038 | Loughlin | June 2, 1942 |
| 2,339,289 | Olken | Jan. 18, 1944 |
| 2,370,692 | Shepherd | Mar. 6, 1945 |
| 2,376,311 | Hood | May 15, 1945 |

FOREIGN PATENTS

| Number | Country | Date |
| --- | --- | --- |
| 835,470 | France | Sept. 19, 1938 |